United States Patent [19]

Imai

[11] Patent Number: 4,637,764
[45] Date of Patent: Jan. 20, 1987

[54] BOLT ADAPTED FOR ONE-HANDED TIGHTENING BY TIGHTENING TOOL

[75] Inventor: Yoshio Imai, Abiko, Japan

[73] Assignees: Nissan Motor Company, Limited, Yokohama; Sannohashi Seisakusho Company, Limited, Tokyo, both of Japan

[21] Appl. No.: 557,184

[22] PCT Filed: Mar. 24, 1983

[86] PCT No.: PCT/JP83/00089

§ 371 Date: Nov. 23, 1983

§ 102(e) Date: Nov. 23, 1983

[87] Pub. No: WO83/03451

PCT Pub. Date: Oct. 13, 1983

[30] Foreign Application Priority Data

Mar. 24, 1982 [JP] Japan .................. 57-40340

[51] Int. Cl.⁴ .......................... F16B 31/00
[52] U.S. Cl. ..................... 411/5; 411/386; 411/424; 411/914
[58] Field of Search ..................... 411/1–5, 411/8, 39, 43, 378, 386, 424; 81/55, 56, 53, 475

[56] References Cited

U.S. PATENT DOCUMENTS

| | | | |
|---|---|---|---|
| 2,385,886 | 10/1945 | Shaff | 411/43 |
| 2,928,302 | 3/1960 | Owen et al. | 411/2 |
| 3,208,328 | 9/1965 | Myers | 411/386 |
| 3,262,353 | 7/1966 | Waeltz et al. | 411/39 |

FOREIGN PATENT DOCUMENTS 5282660 12/1950 Japan.
52128873 3/1951 Japan.

Primary Examiner—Gary L. Smith
Assistant Examiner—Neill Wilson
Attorney, Agent, or Firm—Schwartz, Jeffery, Schwaab, Mack, Blumenthal & Evans

[57] ABSTRACT

A bolt adapted for use in automated manufacturing line such as automotive vehicle assembly line, can be tightened from one side with a mechanical wrench (16). The bolt has a threaded portion (16) engageable with a nut (18), a pin-tail (18) gripped by the mechanical wrench, and a guide section between the threaded portion and the pin-tail. The guide section has a length (l) determined in relation to the thickness (L) of the nut. The length of the guide section is selected so that approximately the entire length of the pin-tail can protrude from the nut when the nut is preliminarily attached to the bolt with about one turn of rotation.

21 Claims, 9 Drawing Figures

BOLT ADAPTED FOR ONE-HANDED TIGHTENING BY TIGHTENING TOOL

FIELD OF THE INVENTION

The present invention relates to a bolt adapted for one-handed tightening with a machine tool. In particular, the invention relates to a bolt suitable for use in an automated manufacturing line such as automotive vehicle assembly line, in which the steps of preliminarily attaching a nut to a bolt and tightening the nut to the bolt are done at different stations within a limited period of time to improve operational efficiency to productivity.

BACKGROUND OF THE INVENTION

In general, when a nut is tightened onto a bolt, a counteracting torque is applied to the head portion of the bolt in order to prevent the bolt from rotating during the tightening operation. When the head portion of the bolt is not accessible to a worker's hand or tool, the reacting torque must be applied to the bolt in some other suitable way.

As an example of a method used in automotive vehicle assembly lines a resisting plate of a size large enough to abut surrounding a vehicle parts is attached to the bolt, thus restricting rotation thereof due to contact of the resisting plate with other vehicle parts and then the nut is tightened onto the bolt.

This method is considered to be uneconomical as it requires an extra operation to clamp the resisting plate onto the bolt head and wastes material. It is also well-known to tighten the nut onto the bolt by restricting the rotation of the bolt with a mechanical wrench. A bolt capable of being tightened by a mechanical wrench has a pin-tail section adapted to be gripped by an inner socket of the wrench so that torque may be applied in the direction opposite to the direction of tightening the nut. Outer socket of the wrench grips the nut to rotate the latter in the tightening direction to tighten the nut at a predetermined torque. To attach the nut to the bolt prior to the tightening, the nut is preliminarily attached to the bolt which is inserted in its predetermined position. In the prior art, the pin-tail portion is coaxial with the threaded portion of the bolt. Therefore, in order for the pin-tail portion to protrude sufficiently far from the nut to allow the pin-tail portion to be successfully gripped by the wrench, the nut has to be rotated several turns. Therefore, the working efficiency of the pre-attaching operation was quite low, leading to a low efficiency of the entire assembly line.

On the other hand, in automotive vehicle assembly lines and the like, it is necessary to tighten a relatively large number of nuts to bolts within a relatively short period of time. Therefore, the period of time allowed for the preliminary attachment of each nut to its bolt is extremely short. At the same time, however, it is necessary to allow the pin-tail section to protrude sufficiently far from the nut to enable the inner socket of the wrench to grip it. As a result, in an automated line, such as an automotive vehicle assembly line, wherein pre-attaching and tightening are performed at different stations, this method has not been considered to be practical due to low efficiency.

In tightening the nut to the bolt, the required tightening torque varies according to the part of the vehicle to which the bolt is applied. Therefore, when several nuts must be tightened at different required torques, the tightening torques between vehicles tend to be nonuniform. Accordingly, in order to obtain a uniform torque, the worker on the line has to perform the tightening operation very carefully. This results in lower working efficiency. However, even when tightening operation is performed, very carefully, some nonuniformity among tightening torques is inevitable. However, in automotive vehicle manufacture, maintaining the predetermined tightening torque is very important for the security of the vehicle. Insufficient tightening torque may seriously influence the operating safety the vehicle.

With the foregoing problems in the prior art in mind, the present invention is intended to provide a bolt which make tightening of the nut with a mechanical wrench easier in order to improve efficiency and productivity in an automated manufacturing line.

Another and more specific object of the present invention is to provide a bolt which exposes a sufficiently long pin-tail during the step of pre-attaching the nut to the bolt for tightening with a mechanical wrench.

SUMMARY OF THE INVENTION

In order to accomplish the above-mentioned and other objects, a bolt, according to the present invention, is provided with a guide section positioned between a threaded portion and a grip portion constituted by a pin-tail portion. The guide section is sufficiently long to protrude far enough from the nut to be gripped by an inner socket of a wrench in order to restrict rotation of the bolt during tightening with the mechanical wrench while the nut is being preliminarily attached to the bolt. Preferably, the length of the guide section is selected that essentially the entire length of the free end protrudes from the nut when the nut is preliminarily attached to the bolt with one or two turns.

Further, according to the present invention, a groove of predetermined depth is formed circumferentially around the guide section. The groove is adapted to shear when the tightening torque reaches the predetermined value in order to obtain uniform tightening torque. In preferred construction, the groove is provided at or near the juncture of the guide section and the free end portion. By disposing the groove at a point remote from the threaded portion, rusting of the threaded portion is successfully prevented.

DESCRIPTION OF THE PREFERRED EMBODIMENT

Figure 1:
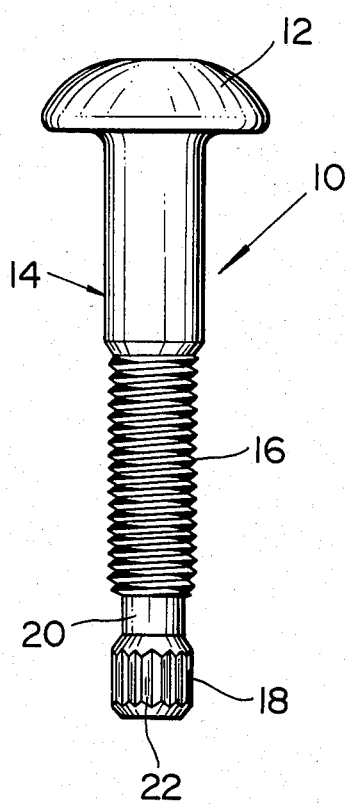
FIG. 1 is a front elevation of the preferred embodiment of a bolt according to the present invention.
Figure 2:
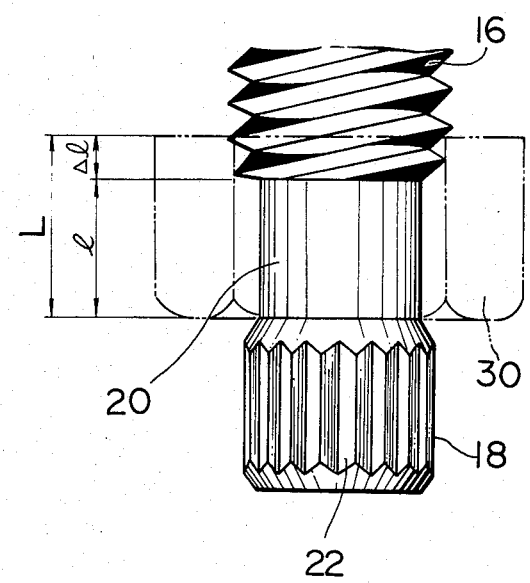
FIG. 2 is an enlarged view of a crucial portion of the bolt of FIG. 1.
Figure 3:
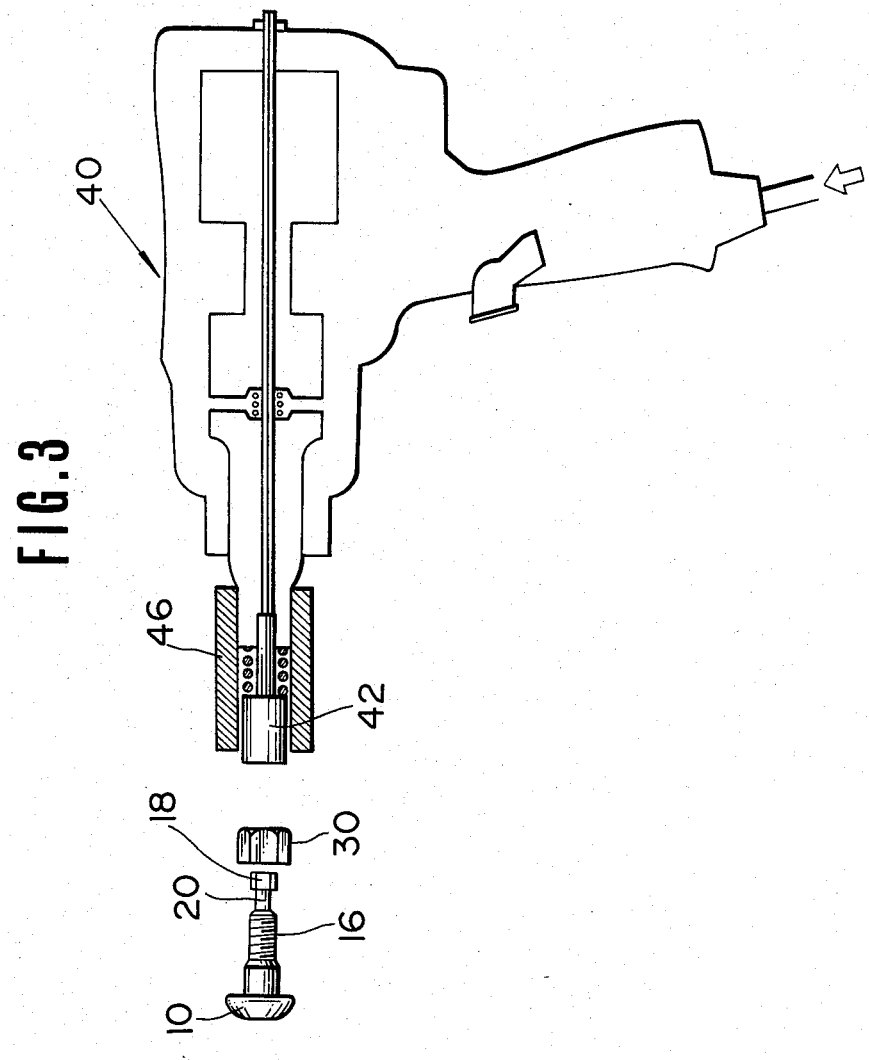
FIG. 3 is an illustration of a mechanical wrench used to tighten a nut.

Referring to the drawings, particularly to FIGS. 1 and 2, the first embodiment of bolt 10 according to the present invention comprises a head 12 and a shaft 14. A threaded portion 16 is formed in the shaft. Also, a pin-tail 18 designed to engage with an inner socket 42 of a mechanical wrench shown in FIG. 3 is formed in the shaft. Finally, a guide section 20 is formed in the shaft between the threaded portion 16 and the pin-tail 18.

Axially extending spline grooves 22 are formed in the pin-tail to engage with spline grooves 44 of the inner socket 42 (see FIG. 5) in order to restrict rotation of the bolt while a nut 30 is being tightened.

Although the engagement between the pin-tail 18 and the inner socket 42 is shown to be established by spline engagement, the form of the pin-tail is not restricted to the foregoing structure and could assume any configuration appropriate for engagement with the socket for restricting rotation of the bolt.

On the other hand, the bolt is generally fabricated by cold-working and threaded thereafter by means of a threading die. Then, the guide section 20 is machined to a smaller diameter than the diameter at the bottom of the threaded portion 16. The diameter of the pin-tail 18 is also smaller than that at the bottom of the threaded portion 16. In the preferred configuration, the diameter of the pin-tail 18 is slightly larger than that of the guide.

As shown in FIG. 2, the length l of the guide section is so designed that, when the nut 30 with a thickness L is preliminarily attached to the bolt by rotation through one turn, the entire length of the pin-tail 18 can protrude from the nut. In the present case, the thickness L of the nut is approximately 1.2 to 1.6 times the diameter of the bolt. In general, when the nut is rotated one turn, the nut may engage 1 to 3 threads of the threaded portion of the bolt. Therefore, the length l of the guide section 20 may be shorter by an amount Δl corresponding to the pitch of 1 to 3 threads than the thickness L of the nut.

Figure 4:
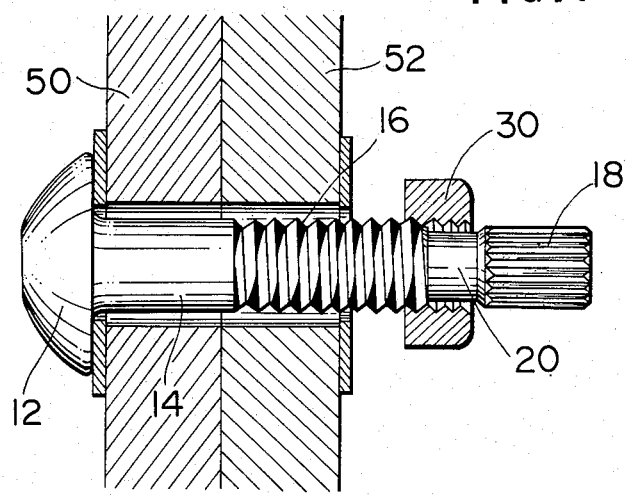
FIG. 4 is an illustration of a bolt of FIG. 1 with the nut in the pre-attached state.
Figure 5:
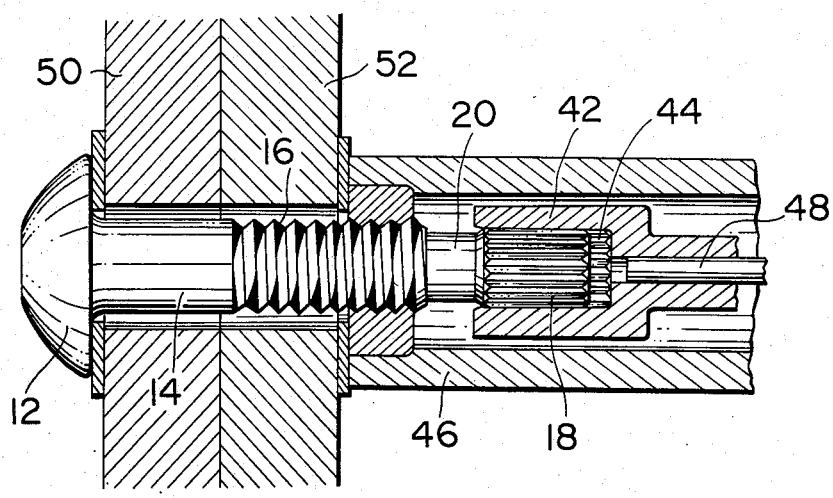
FIG. 5 is an illustration of the bolt of FIG. 1 during tightening of the nut by the mechanical wrench.
Figure 6:
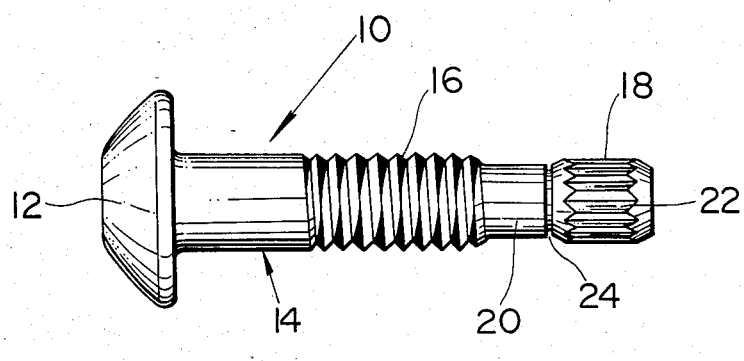
FIG. 6 is a front elevation of the second embodiment of bolt according to the present invention.
Figure 7:
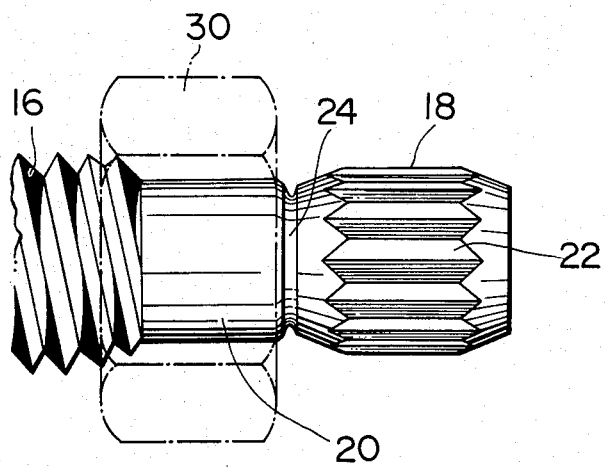
FIG. 7 is an enlarged view of the crucial part of the bolt of FIG. 6.

Tightening of the nut onto the bolt as set forth above will be explained below with reference to FIGS. 3 to 5. First, the general structure of the mechanical wrench 40 will be explained. The mechanical wrench 40 comprises inner socket 42 engageable with the pin-tail 18 of the bolt to hold the bolt stationary with respect to rotation, and an outer socket 46 engageable with the nut to rotate the latter in the tightening direction. The inner and outer sockets are driven with mutually opposite rotational torques so that the inner socket applies a counteracting torque to the bolt to prevent bolt rotation while the outer socket grips the nut for tightening.

In the process of tightening the nut onto the bolt, the bolt is passed through aligned openings formed in members 50 and 52 to be connected. Then, as shown in FIG. 4, the nut is preliminarily attached to the bolt with about one turn of rotation in a pre-attaching process. Thereafter, the nut is tightened with a predetermined tightening torque with the mechanical wrench, in the manner shown in FIG. 5. As apparent from FIG. 4, when the nut is in the pre-attached position, the entire length of pin-tail 18 protrudes as set forth in connection with FIG. 2. This length of the pin-tail 18 is sufficient for the inner socket 42 to grip the former to restrict bolt rotation. Therefore, during tightening with the mechanical wrench, bolt rotation can be successfully prevented.

According to the foregoing embodiment, it is sufficient to rotate the nut through about one turn to preliminarily attach the nut to the bolt while allowing the pin-tail to protrude sufficiently far from the nut for tightening with the mechanical wrench. Therefore, it is possible to shorten the time of the pre-attaching operation. In addition, in the nut-tightening process, rotation of the bolt can be securely prevented.

FIGS. 6 to 9 show the second embodiment of a bolt according to the present invention. In this embodiment, the bolt 10 is formed with a circumferentially extending groove 24 at a point between the pin-tail 18 and the guide section 20. This groove 24 defines a shearing torque to be applied to the pin-tail 18 via the inner socket 42 in the direction opposite to the rotating direction of the nut, when the nut is to be tightened with the predetermined torque. In more detail, the shearing torque is determined by the shape and depth d of the groove and the strength of the material.

As in the foregoing first embodiment, the length of the guide section 20 is determined so that the entire length of the pin-tail can protrude from the nut when the nut is preliminarily attached with about one turn of rotation. Therefore, the length of the guide section 20 is less than the the thickness L of the nut by an amount Δl which corresponds to 1 to 3 threads of the threaded portion 16. Although the location of the groove can vary, it is preferable to form it at a point remote from the threaded portion so that corrosion which may result at the sheared end will not extend to the threaded portion. Furthermore, as set forth above, the shearing torque is determined by the shape of the groove and the groove in the preferred configuration is V-shaped in order to specify the point of shear. By using a V-shaped groove, precise control of the tightening torque is possible.

Figure 8:
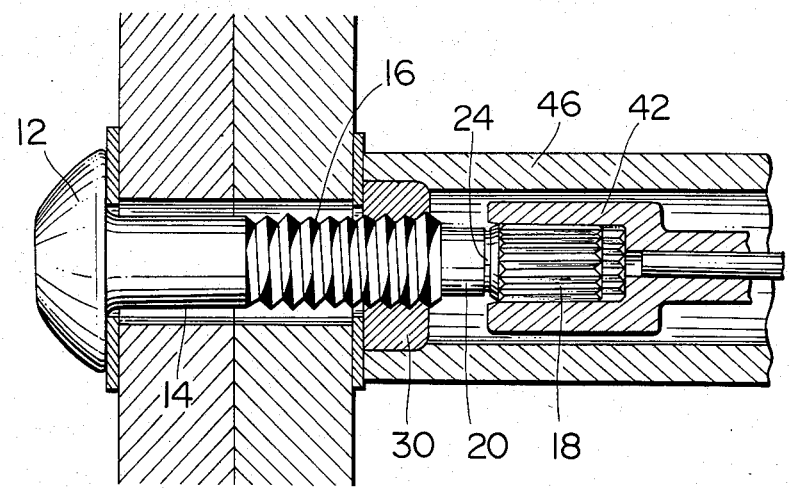
FIG. 8 is an illustration of the bolt of FIG. 6 in a position similar to that of FIG. 5.
Figure 9:
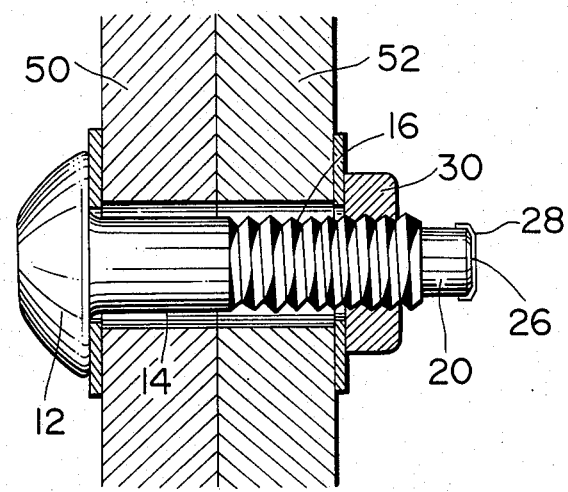
FIG. 9 is an illustration of the bolt of FIG. 6 following completion of the tightening of the nut.

FIGS. 8 and 9 show the process of connecting the members 50 and 52 by means of the bolt of the second embodiment. As in the foregoing first embodiment, the inner socket 42 of the mechanical wrench grips the pin-tail 18 and the outer socket 46 grips and rotates the nut. As set forth above, when the torque applied to the nut through the outer socket 46 reaches the predetermined value, the torque applied to the pin-tail 18 via the inner socket is equal to that applied to the nut. Therefore, a torsional force is exerted between the pin-tail 18 and the threaded portion 16. Due to this torsional force, the groove 24 shears. Due to the shearing of the groove, the counteracting torque restricting bolt rotation is lost, making it impossible to tighten the nut a torque beyond the predetermined torque. The sheared pin-tail 18 remaining in the inner socket 42 may be removed by a knock-out pin 48 provided in the wrench.

As shown in FIG. 9, after the pin-tail 18 has been sheared off, the guide section 20 remains interposed between the threaded portion 16 and the sheared end. Therefore, even if the sheared end rusts or corrodes, it will not extend to the threaded portion to cause seizure of the nut to the threaded portion.

Preferably, the sheared end 26 may be coated with a layer of paint 28 for rust prevention. In this case, it may be possible to indicate the tightening torque applied by means of different colors of paints, each specifying a specific torque.

As set forth above, according to the present invention, pre-attaching of the nut to the bolt is made easier and shorter. This may result in improving the productivity of an automated manufacturing line. In addition, according to the second embodiment, the tightening torque of the nut is determined by a pre-set torque built into the bolt itself and rust in the threaded portion after tightening can be successfully prevented.

I claim:

1. A fastener adapted to be tightened from one side by means of a tightening tool having an inner socket for gripping a one-handed tightening bolt to prevent the bolt from rotating and an outer socket for applying a rotational force to a nut to tighten the nut to the bolt, the one-handed tightening bolt comprising:

a threaded portion engaging an internally threaded nut and extending from a position adjacent a bolt head, said nut having a thickness equal to or greater than the diameter of said bolt;

a grip portion to be gripped by an inner socket of a tightening tool for preventing rotation, said grip portion being located adjacent the end of said bolt remote from said bolt head;

a non-threaded, cylindrical guide section interpositioned between said threaded portion and said grip portion and having a given length, whereby approximately the entire length of the grip portion protrudes from the nut when the nut is preliminarily attached with about one-to-two turns of tightening rotation; and means, formed on said guide section between said threaded portion and said grip portion, for shearing when the tightening torque of the nut reaches a predetermined value in order to hold the nut tightening torque to the predetermined value, said shearing means being located at the end of said guide section adjacent said grip portion.

2. A one-handed tightening bolt, comprising:

a bolt head and a shaft extending from said bolt head, said shaft including:

a threaded portion engaging an internally threaded nut, said nut having a thickness equal to or greater than the diameter of said bolt;

a grip portion to be gripped by a nut tightening tool, and located adjacent the end of said shaft remote from said bolt head;

a non-threaded, cylindrical guide section interpositioned between said threaded portion and said grip portion and having a length approximately equal to the thickness of the threaded portion of said nut less the axial length traversed by said nut upon being rotated through one-to-two turns of tightening rotation.

3. The bolt as set forth in claim 2, wherein the guide section has a length shorter than the thickness of the nut by an amount corresponding to the approximate length of one to three threads.

4. The bolt as set forth in claim 2, wherein said grip portion is formed with at least one axially extending groove on the periphery thereof for engagement with said nut tightening tool.

5. The bolt as set forth in claim 2, wherein said grip portion engages said nut tightening tool by means of spline for preventing the bolt from rotating while the nut is being tightened.

6. The bolt as set forth in claim 2, wherein said guide section is provided with means designed to shear when the tightening torque reaches a predetermined value in order to hold the tightening torque to a constant value.

7. The bolt as set forth in claim 6, wherein said means comprises a groove formed on the outer circumference of the guide section.

8. The bolt as set forth in claim 7, wherein said groove has a depth (d) defining the predetermined tightening torque.

9. The bolt as set forth in claim 8, wherein said groove is formed on guide section adjacent the grip portion.

10. The bolt as set forth in claim 2, wherein the thickness of the nut is approximately 1.2 to 1.6 times the diameter of said bolt.

11. A fastener adapted to be tightened from one side by means of a tightening tool having an inner socket for gripping a one-handed tightening bolt to prevent the bolt from rotating and an outer socket for applying a rotational force to an internally threaded nut to tighten the nut to the bolt, the one-handed tightening bolt comprising:

a bolt head;

a threaded portion engaging said nut and extending from a position adjacent said bolt head, said nut having a thickness equal to or greater than the diameter of said bolt;

a grip portion to be gripped by an inner socket of a tightening tool for preventing rotation, said grip portion being located adjacent the end of said bolt remote from said bolt head;

a non-threaded, cylindrical guide section interposed between said threaded portion and said grip portion and having a length approximately equal to the thickness of the threaded portion of said nut less the axial length traversed by said nut upon being rotated through one-to-two turns of tightening rotation; and means, formed on said guide section between said threaded portion and said grip portion, for shearing when the tightening torque of the nut reaches a predetermined value in order to hold the nut tightening torque to the predetermined value, said shearing means being located at the end of said guide section opposite said threaded portion.

12. The bolt as set forth in claim 11, wherein the guide section has a length shorter than the thickness of the nut by an amount corresponding to the approximate length of one to three threads.

13. The bolt as set forth in claim 11, wherein said means comprises a groove formed along the outer circumference of the guide section.

14. The bolt as set forth in claim 13, wherein said groove has a depth (d) defining a predetermined tightening torque.

15. The bolt as set forth in claim 11, wherein the thickness of the nut is approximately 1.2 to 1.6 times the diameter of said bolt.

16. The bolt as set forth in claim 12, wherein said means comprises a groove formed along the outer circumference of said guide section, said groove having a depth defining a predetermined tightening torque of the nut.

17. The bolt as set forth in claim 16, wherein said groove is formed at the juncture of said guide section and said grip portion.

18. The bolt as set forth in claim 11, wherein said grip portion is formed with at least one axially extending notch engageable with said inner socket.

19. The bolt as set forth in claim 12, wherein said grip portion is engageable with said inner socket by spline engagement in order to prevent the bolt from rotating when the nut is being tightened.

20. The bolt as set forth in claim 19, wherein said means comprises a groove having a depth defining a predetermined tightening torque of the nut.

21. A one-handed tightening bolt comprising:
a bolt head and a shaft extending from said bolt head, said shaft including:
a threaded portion engaging an internally threaded nut, the thickness of said nut being equal to or greater than the diameter of said bolt;
a grip portion to be gripped by a nut tightening tool, and located adjacent the end of said shaft remote from said bolt head; and
a non-threaded, cylindrical guide section interpositioned between said threaded portion and said grip portion and having a given length, whereby approximately the entire length of the grip portion protrudes from the nut when the nut is preliminarily attached with about one-to-two turns of tightening rotation.

* * * * *